United States Patent [19]

Shimanaka

[11] Patent Number: 4,967,620
[45] Date of Patent: Nov. 6, 1990

[54] LINE PRESSURE CONTROL SYSTEM FOR AUTOMOTIVE AUTOMATIC TRANSMISSION HAVING SELF-ADJUSTING LEVEL CONTROL

[75] Inventor: Shigeki Shimanaka, Hadashino, Japan

[73] Assignee: Nissan Motor Co., Ltd., Yokohama, Japan

[21] Appl. No.: 387,285

[22] Filed: Jul. 31, 1989

[30] Foreign Application Priority Data

Aug. 1, 1988 [JP] Japan ................................ 63-190532

[51] Int. Cl.$^5$ ........................................... B60K 41/18
[52] U.S. Cl. ....................................... 74/866; 74/867
[58] Field of Search ................................ 74/866, 867

[56] References Cited

U.S. PATENT DOCUMENTS

| | | | |
|---|---|---|---|
| 4,266,447 | 5/1981 | Heess et al. ............................ | 74/858 |
| 4,742,461 | 5/1988 | Eschrich et al. .................. | 74/867 X |
| 4,779,491 | 10/1988 | Fujiwara et al. .................. | 74/867 X |
| 4,787,272 | 11/1988 | Taga et al. ............................ | 74/867 |
| 4,791,568 | 12/1988 | Hiramatsu et al. ................ | 74/867 X |
| 4,843,922 | 7/1989 | Kashihara ........................ | 74/867 X |

OTHER PUBLICATIONS

Nissan Full-Range Automatic Transmission Re4R01A Type, Service Manual, (A261C07) issued on Mar. 1987, by Nissan Motor Company Limited.

Primary Examiner—Dirk Wright
Attorney, Agent, or Firm—Foley & Lardner, Schwartz, Jeffery, Schwaab, Mack, Blumenthal & Evans

[57] ABSTRACT

The outputs of one or more the sensors involved in the control of the transmission line pressure level are monitored. In the event that one of the same exhibits characteristics indicative that it is malfunctioning, a self-update function which modifies the line pressure level based on the length of a shift time is inhibited in order to prevent the line pressure being adjusted in a totally erroneous manner.

6 Claims, 5 Drawing Sheets

LINE PRESSURE CONTROL SYSTEM FOR AUTOMOTIVE AUTOMATIC TRANSMISSION HAVING SELF-ADJUSTING LEVEL CONTROL

BACKGROUND OF THE INVENTION

1. Field of the Invention

The present invention relates generally to a transmission line pressure control system which includes a self-adjust function wherein the line pressure level is adjusted during the operation of the transmission in a manner which compensates for unit to unit differences and wear which occurs with the passing of time, and more specifically to such a system which inhibits the self adjust function in the event that pertinent sensors malfunction.

2. Description of the Prior Art

An automatic transmission Service Manual (publication A261C07) issued in March 1987 relating to the so called RE4R01A type transmission describes an arrangement which utilizes tabled data for controlling the line pressure during shifting and non-shifting modes of transmission operation. In this arrangement the engine throttle valve opening degree is used to determine the duty cycle of a signal used to control a line pressure control solenoid valve.

However, the solenoids used for the purposes of line pressure control and the friction elements used in a given transmission, inevitably exhibit a unit to unit variation and/or exhibit a change in characteristics with the passing of time due to wear and the like deterioration.

Accordingly, the transmission control tends to deteriorate to the point of permitting strong shift shocks and/or excessive friction element slippage which shortens the working life of the friction elements per se.

The above mentioned changes and/or unit to unit variations cannot be compensated unless it is possible to change the line pressure control valve duty cycle.

SUMMARY OF THE INVENTION

Experiments have shown that during upshifting if the inertia phase time (viz., the time from which the input/output rotational speed ratio begins to change from from a value indicative of one gear until it reaches that indicative of the gear to which the shift is being made) varies with the level of line pressure.

Accordingly, it has been proposed in JP-A-62-327452 to use an arrangement wherein the rotational speeds of the input and output shafts are monitored and the respective rotational speed sensors used to calculate the length of a so called inertia phase; the calculated inertia time is compared with a target valve; and level of line pressure is adjusted in accordance with the difference between the two.

However, even in such a system if one (or more) of the sensors which is used to provide the necessary input data via which the above mentioned self adjust function is achieved, should malfunction, there is no telling in which direction and to what degree the line pressure level will be adjusted during shifts and the possibility of grossly excessive or insufficient line pressure levels which lead to excessive shift shock or abnormal slippage can occur.

It is therefore an object of the present invention to provide a diagnostic arrangement for a self adjusting type line pressure control system which can inhibit the self adjust function in the event that a sensor malfunction is indicated.

In more specific terms, a first aspect of the present invention is deemed to comprise a transmission line pressure control arrangement for a transmission which is operatively connected with an engine, said control arrangement featuring: an engine speed sensor, said engine speed sensor being arranged to produce an engine speed indicative signal; a transmission output shaft rotational speed sensor; control means responsive to said transmission output shaft rotational speed sensor and said engine speed sensor for: determining a shift time which is defined between the point in time when the engine speed exhibits a predetermined rate of change, and a point in time when a predetermined relationship between the transmission output shaft rotational speed and the engine rotational speed occurs; adjusting the line pressure level in a manner which brings the shift time to a target value for the instant shift; monitoring the inputs of said engine speed sensor and said transmission output shaft rotational speed sensor; and inhibiting the line pressure adjustment in the event said monitoring indicates one of said engine speed sensor and said transmission output shaft rotational speed sensor is malfunctioning.

A second aspect of the present invention is deemed to comprise a method of controlling transmission line pressure in a transmission which is operatively connected with an engine, the method featuring the steps of: sensing engine speed and producing an engine speed indicative signal, sensing the rotational speed of a transmission output shaft; determining a shift time which is defined between the point in time when the engine speed exhibits a predetermined rate of change, and a point in time when a predetermined relationship between the transmission output shaft rotational speed and the engine rotational speed occurs; adjusting the line pressure level in a manner which brings the shift time to a target value for the instant shift; monitoring the inputs of said engine speed sensor and said transmission output shaft rotational speed sensor; and inhibiting the line pressure adjustment in the event said monitoring indicates one of said engine speed sensor and said transmission output shaft rotational speed sensor is malfunctioning.

A third aspect of the present invention is deemed to comprise a transmission line pressure control arrangement for a transmission which is operatively connected with an engine, said control arrangement featuring: an engine speed sensor, said engine speed sensor being arranged to produce an engine speed indicative signal; a transmission output shaft rotational speed sensor; a transmission input shaft rotational speed sensor control means responsive to said transmission output shaft rotational speed sensor, said transmission input shaft rotational speed sensor and said engine speed sensor for: determining a shift time which is defined between the point in time when the transmission output shaft rotational speed exhibits a first predetermined relationship with the rotational speed of the transmission input shaft and the time when the transmission output shaft rotational speed exhibits a second predetermined relationship with the rotational speed of the transmission input shaft; adjusting the line pressure level in a manner which brings the shift time to a target value for the instant shift; monitoring the inputs of said engine speed sensor, said transmission input shaft rotational speed sensor and said transmission output shaft rotational speed sensor; and inhibiting the line pressure adjustment in the event said monitoring indicates one of said engine speed sensor, said transmission input shaft rotational speed sensor and said transmission output shaft rotational speed sensor, is malfunctioning.

A fourth aspect of the present invention is deemed to comprise a method of controlling transmission line pressure in a transmission which is operatively connected with an engine, the method featuring the steps of: sensing engine speed and producing an engine speed indicative signal; sensing the rotational speed of a transmission input shaft; sensing the rotational speed of a transmission output shaft; determining a shift time which is defined between the point in time when the transmission output shaft rotational speed exhibits a first predetermined relationship with the rotational speed of the transmission input shaft and the time when the transmission output shaft rotational speed exhibits a second predetermined relationship with the rotational speed of the transmission input shaft; adjusting the line pressure level in a manner which brings the shift time to a target value for the instant shift; monitoring the inputs of said engine speed sensor, said transmission input shaft rotational speed sensor and said transmission output shaft rotational speed sensor; and inhibiting the line pressure adjustment in the event said monitoring indicates one of said engine speed sensor, said transmission input shaft rotational speed sensor and said transmission output shaft rotational speed sensor, is malfunctioning.

A fifth aspect of the present invention is deemed to comprise a transmission line pressure control arrangement for a transmission which is operatively connected with an engine, said control arrangement featuring: an engine speed sensor, said engine speed sensor being arranged to produce an engine speed indicative signal; a transmission output shaft rotational speed sensor; control means responsive to said transmission output shaft rotational speed sensor and said engine speed sensor for: determining a shift time which is defined between the point in time when the engine speed exhibits a predetermined rate of change, and a point in time when a predetermined relationship between the transmission output shaft rotational speed and the engine rotational speed occurs; adjusting the line pressure level in a manner which brings the shift time to a target value for the instant shift; monitoring said engine speed sensor input; continuously updating a recorded value of the engine speed in accordance with the value indicated by said engine speed, sensor input during non-shifting modes of transmission operation; comparing the engine speed with the recorded value during upshifting modes of transmission operation; determining the engine speed sensor to be malfunctioning in the event that the instant engine speed value and the recorded value exhibit a predetermined relationship during said comparison; and inhibiting the line pressure adjustment in the event said monitoring indicates said engine speed sensor is malfunctioning.

A sixth aspect of the present invention is deemed to comprise a method of controlling transmission line pressure in a transmission which is operatively connected with an engine, featuring the steps of: sensing engine speed and producing an engine speed indicative signal; sensing the rotational speed of a transmission output shaft; determining a shift time which is defined between the point in time when the engine speed exhibits a predetermined rate of change, and a point in time when a predetermined relationship between the transmission output shaft rotational speed and the engine rotational speed occurs; adjusting the line pressure level in a manner which brings the shift time to a target value for the instant shift; monitoring said engine speed sensor input; continuously updating a recorded value of the engine speed in accordance with the value indicated by said engine speed sensor input during non-shifting modes of transmission operation; comparing the engine speed with the recorded value during upshifting modes of transmission operation; determining the engine speed sensor to be malfunctioning in the event that the instant engine speed value and the recorded value exhibit a predetermined relationship during said comparison; and inhibiting the line pressure adjustment in the event said monitoring indicates said engine speed sensor is malfunctioning.

DETAILED DESCRIPTION OF THE PREFERRED EMBODIMENTS

Figure 1:
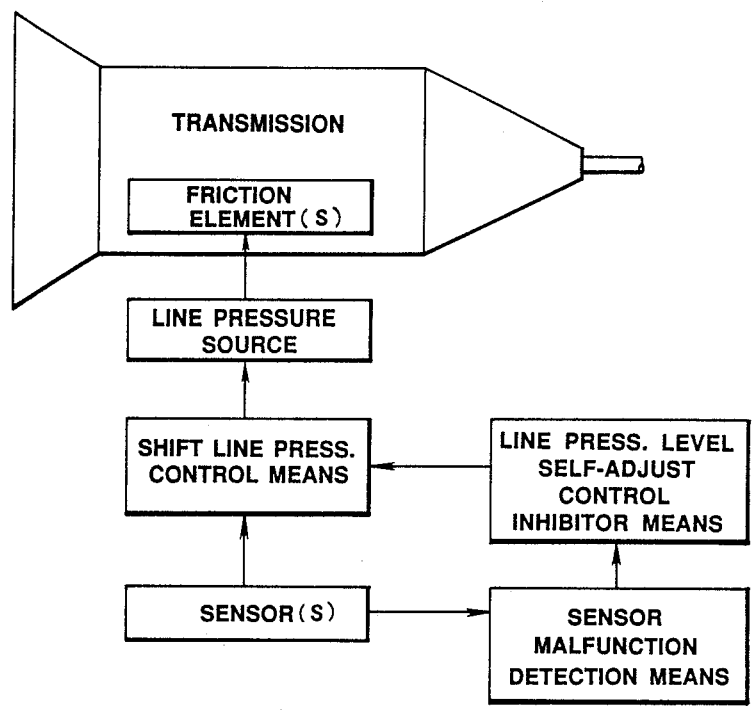
FIG. 1 is a schematic block diagram which depicts the conceptual arrangement of the present invention.
Figure 2:
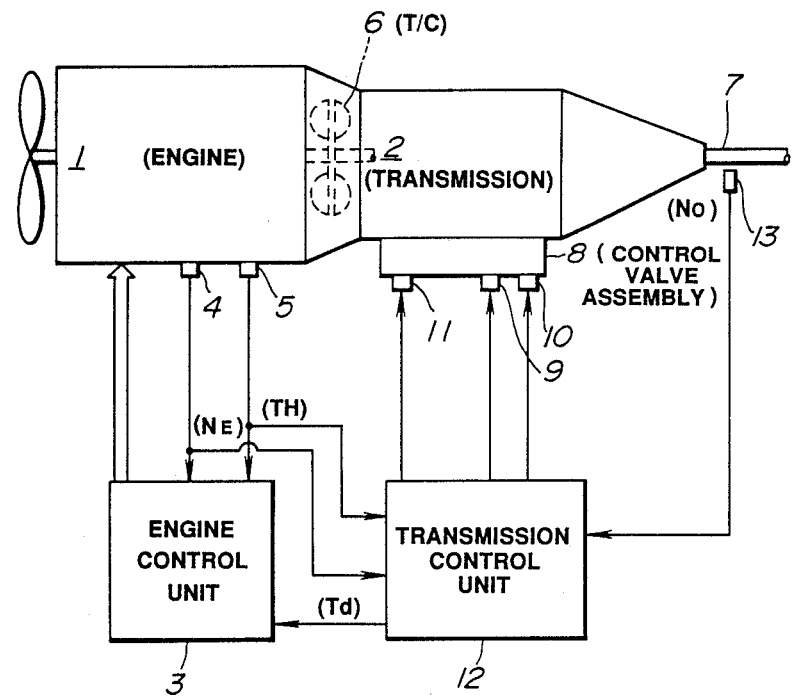
FIG. 2 is a schematic diagram showing and engine/transmission system to which a first embodiment of the is applied.

FIG. 2 shows a power train to which an embodiment of the present invention is applied. In this arrangement an electronically fuel injected internal combustion engine 1 is operatively connected by way of a torque converter 6 to a transmission 2.

It should be understood that even though FIG. shows a F-R type power train (front engine - rear wheel drive) the present invention is not limited to the same and can be applied to FF, MR or four-wheel drive 4WD type arrangements if so desired.

The engine control system includes an engine control unit 3 which is supplied inputs from an engine speed sensor 4 and a throttle position sensor 5, Based on the inputs of sensors 4 and 5, the engine control unit 3 which in this instance includes a microprocessor (not show), derives the appropriate injection control pulse width and applies the same to the fuel supply system of the engine.

In this embodiment, the transmission 2 comprises (merely by way of example) a RE4RO1A type transmission developed by NISSAN MOTOR CO. LTD., the construction and arrangement of which is described in detail in the Service Manual A261C07 published by the above mentioned company.

A transmission output shaft 7 provides a drive connection between the differential or final gear (not shown) and the transmission.

The transmission is provided with a transmission control unit 12 which also includes a microprocessor. This unit 12 is arranged to issue control signals to a control valve assembly 8 which forms part of the transmission. The control valve assembly 10 includes three solenoids 9, 10 and 11.

In this embodiment the transmission includes a gear train comprising a plurality of planetary gear units, and associated hydraulically operated clutches and brakes (not shown). The brakes and clutches are operated by the supply of line pressure which is selectively supplied from the control valve assembly 8.

Depending on the energization of solenoids 9 and 10, the transmission is conditioned to selectively produce a number of different gear ratios by selectively inducing line pressure to be supplied to the appropriate friction elements.

In this instant arrangement four forward gear ratios of the transmission can be produced in the manner indicated in the table below.

TABLE 1

| GEAR: | FIRST | SECOND | THIRD | FOURTH |
|---|---|---|---|---|
| SOL. 9: | ON | OFF | OFF | ON |
| SOL. 10: | ON | ON | OFF | OFF |

The third solenoid 11 of the control valve unit 8 is arranged to be operated on a variable duty cycle and to control the level of the line pressure.

The transmission control unit 12 is arranged to receive a data input No from a rotational speed sensor 13. As will be appreciated from the drawings No is indicative of the rotational speed of the transmission output shaft 7. The transmission control unit 12 is further arranged to receive data inputs from the engine speed sensor 4 and the throttle position (engine load) sensor 5.

Based on the data input from the above mentioned sensors the transmission control unit 12 outputs suitable controls signals to the the solenoids 9, 10 and 11. This unit further derives and outputs a "torque down" (viz., torque reduction signal) to the engine control unit 3.

In response to this torque down signal the engine control unit can reduce the amount of fuel supplied to the engine by cutting the supply to selected cylinders for example or by modifying the ignition timing.

Figure 3:
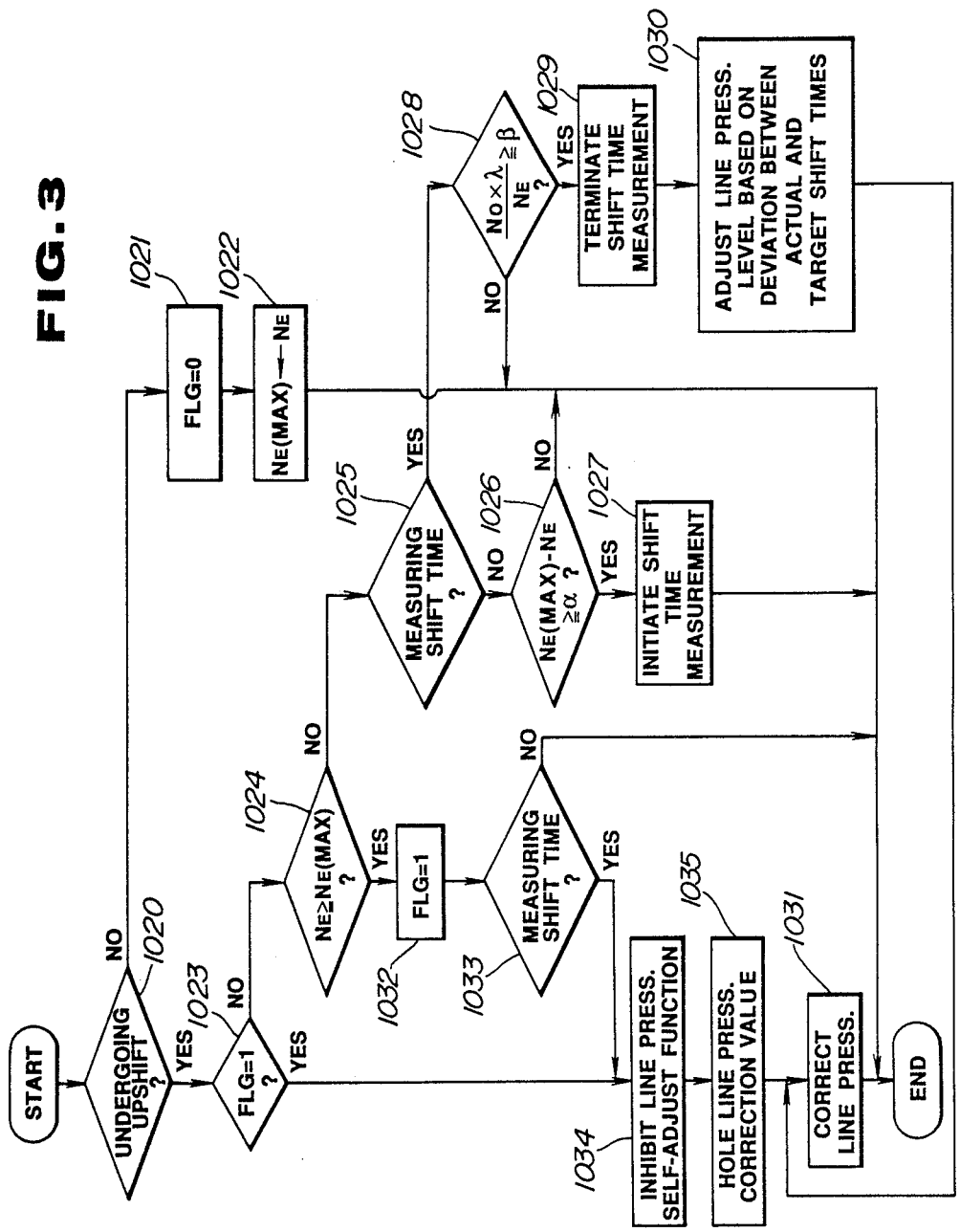
FIG. 3 is a flow chart showing the a self-adjust control routine which incorporates diagnostic and inhibit features according to a first embodiment of the present invention.

FIG. 3 shows a line pressure self-adjust routine which includes the diagnostic and inhibit steps which characterize a first embodiment of the present invention. It will be noted that this routine relates only to the control which is performed during an upshift which takes place at low engine speed. The first step 1020 of this routine is therefore such as to determine if the transmission is undergoing an upshift or not and therefore determine if it is necessary to run a self-adjust sub-routine or not.

This decision can be made by sampling the decisions made by a shift control program which determines based on the TH and No values (i.e. the engine load and the vehicle speed) which gear the transmission should be conditioned to produce and which gear the transmission is currently conditioned to produced. For further details concerning the manner which which such decisions are made reference can be had to copending U.S. Pat. application Ser. No. 07/330,129 filed on Mar. 29, 1989 in the name of Narita and still pending. The content of this document is hereby incorporated by reference thereto.

In brief, this document discloses an arrangement wherein the states of two solenoids which control four forward gears of a transmission, are toggled between ON and OFF states in response to the outcome of a comparative ranging of a ratio developed by comparing with the rotational speeds of the input and output gears with limits derived from pre-recorded data. In the case of a power ON upshift data which is recorded in terms of throttle opening is used. On the other hand, when a power OFF upshift is induced by releasing the vehicle accelerator pedal, data which is recorded in terms of vehicle speed is used to set the limits.

If the transmission is not undergoing an upshift, then at step 1021 an engine rotational speed sensor malfunction flag FLG is reset (i.e. FLG =0) and at step 1022 the instant engine rotational speed Ne value is recorded in memory as Ne(MAX). This latter mentioned value NE(MAX) is used as a standard for determining sensor malfunction.

On the other hand, if the transmission is found to be undergoing at upshift at step 1020 then at step 1023 the status of the sensor malfunction flag is determined. If the flag has not been set (indicating normal sensor operation) the the routine flows to step 1024 wherein the instant engine speed is compared with the Ne(MAX) value. In the event that this comparison indicates that the instant engine speed is not greater than or equal to Ne(MAX) then the normal self-adjust process is entered and at step 1025 it is determined if the shift time is being clocked or not. If the outcome of this enquiry is negative, then at step 1026 it is determined if Ne(MAX) $\geq$, $-$Ne $\alpha$. If the difference between Ne(MAX) and the instant engine speed Ne is equal to or greater than $\alpha$ then the routine flows to step 1027 wherein a soft clock which times the length of the shift is set running and the routine ends.

However, in the event that it is found that the shift period timer is in fact running at step 1025 then the routines goes to step 1028 wherein a value which is derived by multiplying the transmission output shaft rotational speed No with a value $\lambda$ (a value indicative of the input/output rotational speed which will be produced by the gear to which the transmission is being upshifted) and dividing the above product with the instant engine speed; is compared with a predetermined value $\beta$.

If No x $\lambda$/Ne $<\beta$ then the routine ends while in the event that it is found to be $\geq$ then at step 1029 the timer which is clocking the shift period is stopped. The count of the timer is then compared with a target value for the instant shift (step 1030) and the duty cycle of the line pressure solenoid valve 11 control signal is adjusted in a direction which tends to reduce the difference between the actual and target shift time counts to zero.

At step 1031 the adjusted duty cycle valve is implemented in a manner which induces an incremental correction in the instant level of line pressure.

As will be understood, in the event that the operation of the engine speed sensor is found to be normal and free of symptoms of malfunction, then the routine flows through the above described steps and the level of line pressure is adjusted in a manner which changes the level in a manner which promotes shock and slip free shifting.

It will be noted that in place of the above described inertia phase time, it is possible in the event that the upshift is made at low engine loads (e.g. very low throttle settings) to time the total shift time period defined between the issuance of a shift command and the point in time the rate at which the engine speed is changing indicates that the shift has been completed.

In the case of the second embodiment (disclosed hereinafter) wherein the rotational speed of the transmission input shaft is also monitored, the completion of the shift can be determined by developing a ratio of the transmission input shaft rotational speed to the output shaft rotational speed and noting the time when the input-/output rotational speed ratio reaches a value indicative of the gear to which will result after the shift is made. For further disclosure relating to this feature, reference may be had to copending U.S. Pat. application Ser. No. 07/376,287 which was filed on July 6, 1989, and still pending, in the name of Akihiko ASANO and which claims priority based on Japanese Patent Application No. 63-166983.

This document discloses a line pressure control system which features the use of a self-adjusting arrangement wherein the total shift time is determined and compared with a target time for the instant shift. The line pressure control duty cycle is modified until the line pressure level is adjusted in a manner which reduces the difference between the actual total shift time and the target value, to zero.

However, in the event that the outcome of step 1024 indicates that Ne ≧ Ne(MAX) then the routine flows to steps 1032 and 1033 wherein the engine speed malfunction flag is set (i.e. FLG =1) and it is determined if the shift timer is running or not. If the shift timer is not running then the routine ends. However, if the shift time is being clocked, then the routine flows to step 1034 wherein a command which inhibits the line pressure self-adjust function is issued. At step 1035 the line pressure correction amount which was determined on the previous run of the routine is temporarily frozen in memory and used to control the level of line pressure until such time as the FLG is reset to 0.

This of course obviates the problem wherein the totally erroneous self adjustment, which is apt to occur if the system is permitted to continue normal adjustment based on the input from the engine speed sensor 4, is permitted to excessively increase or decrease the line pressure to the point of inducing severe shift shock or friction element slippage.

As will be appreciated from the foregoing description, with the first embodiment the line pressure level self adjustment is implemented only during upshifts, and if the engine speed sensor malfunctions, the self adjusting function is inhibited.

Figure 4:
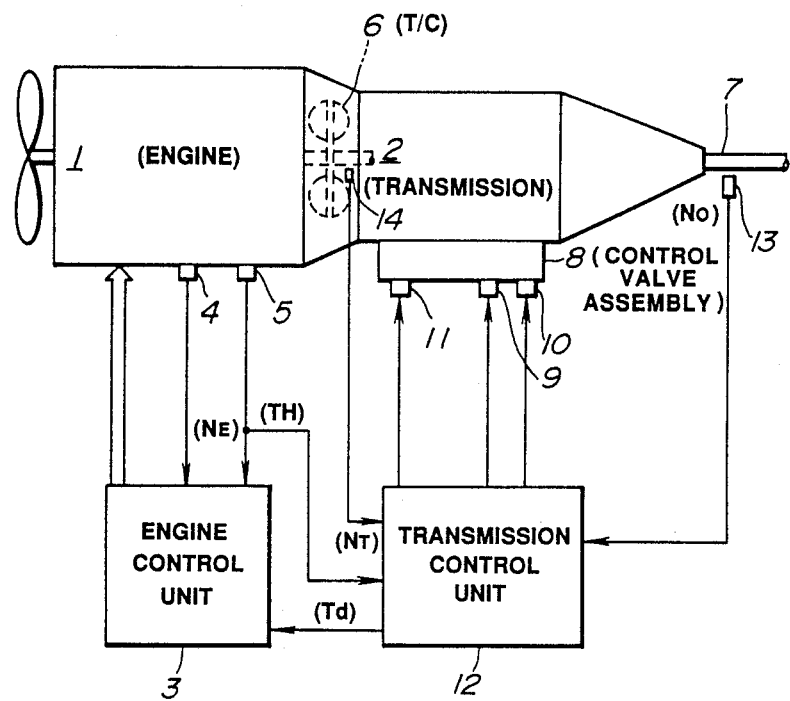
FIG. 4 is a schematic diagram showing and engine/transmission system to which a second embodiment of the present is applied.
Figure 5:
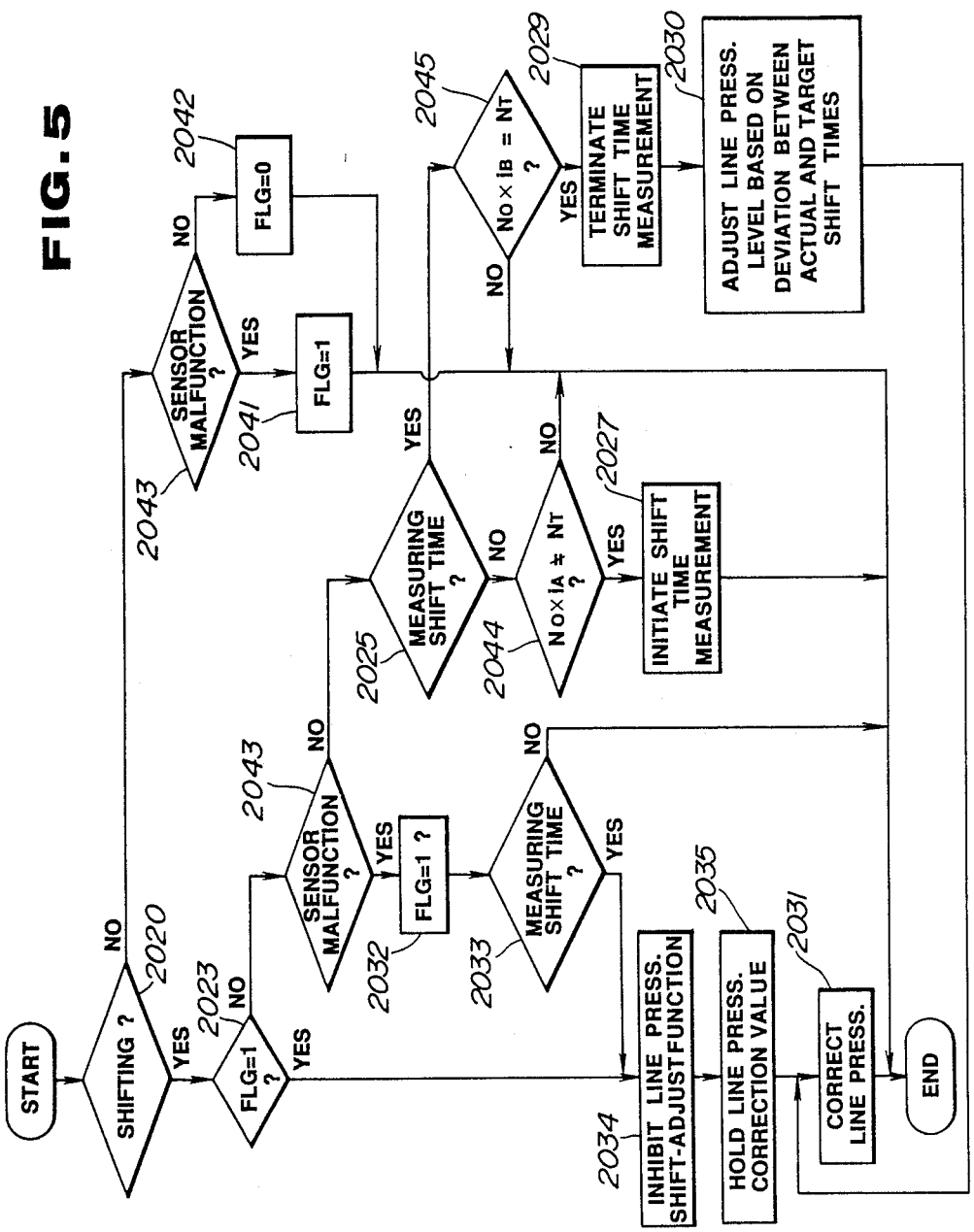
FIG. 5 is a flow chart showing the a self-adjust control routine which incorporates diagnostic and inhibit features according to the second embodiment of the present invention.

FIGS. 4 and 5 show a second embodiment of the invention wherein the line pressure self adjustment is performed during all of the shifting operations.

With this system if one of a plurality of sensors happens to malfunction, the self-adjusting function is inhibited.

The system shown in FIG. 4 differs from the one shown in FIG. 2 in that a transmission input shaft rotational speed sensor 14 is additionally provided and arranged to supply a signal Nt indicative of the rotational speed to the transmission control unit 12.

The routine depicted in FIG. 5 is essentially the same as that shown in FIG. 3 but differs in that at step 2020 the presence of either upshifting or downshifting is sensed and is not restricted to upshifting. In the event that neither an upshift or a downshift is found to be taking place, the routine flows to step 2040 wherein the operation of the sensors 5, 13 and 14 is examined. In the event that all of the sensors are functioning properly, the routine flows to step 2042 wherein the malfunction flag FLG is cleared by being reset to 0. As will be appreciated a number of sub-routines will be run in this step in order to determine if the outputs of the three sensors are actually correctly indicating the instant situation or not.

However, on the other hand, if the one of the sensors is found to be producing an output which deemed indicative improper operation, then the routine flows to step 2041 wherein the malfunction flag FLG is set to 1 and then returns.

In the event that a shift is detected in step 2020, then at step 2023 the status of the sensor malfunction flag is checked. In the event that FLG =0 then the routine flows to step 2043 wherein the same investigation of the sensor operation as conducted in step 2040 is performed.

In the event that all of the three sensors are diagnosed as performing normally, the routine flows to step 2025 wherein it is determined if a shift is being timed or not. Depending on the outcome of this enquiry, the routine flows to either step 2044 or 2045. These steps are essentially the same as steps 1026–1030 with the exception that, at step 2044 the instant transmission output shaft rotational speed No is multiplied with a factor iA indicative of the gear ratio of the gear from which the shift is being made, and the product compared with the instant transmission input speed Nt.

On the other hand, in step 2045 No is multiplied with a factor iB which is indicative of the gear ratio produced by the gear which will be produced after the shift is completed.

If, at step 2023 it is found that all of the sensors are not malfunctioning properly and the malfunction flag FLG has been set, then the routine flows to steps 2034, 2035 and 2031. As will be appreciated, these steps correspond to steps 1034, 1035 and 1031 described previously.

For further information relating to techniques of implementing the above described torque down control reference may be had to USP 4,266,447 which was issued on May 12, 1981 in the name of Heess et al.

What is claimed is:

1. A transmission line pressure control arrangement for a transmission which is operatively connected with an engine, said control arrangement comprising:
    an engine speed sensor, said engine speed sensor being arranged to produce an engine speed indicative signal;
    a transmission output shaft rotational speed sensor;
    control means responsive to said transmission output shaft rotational speed sensor and said engine speed sensor for:
    determining a shift time which is defined between the point in time when the engine speed exhibits a predetermined rate of change, and a point in time when a predetermined relationship between the transmission output shaft rotational speed and the engine rotational speed occurs;
    adjusting the line pressure level in a manner which brings the shift time to a target value for the instant shift;
    monitoring the inputs of said engine speed sensor and said transmission output shaft rotational speed sensor; and
    inhibiting the line pressure adjustment in the event said monitoring indicates one of said engine speed sensor and said transmission output shaft rotational speed sensor is malfunctioning.

2. A method of controlling transmission line pressure in a transmission which is operatively connected with an engine, comprising the steps of:
    sensing engine speed and producing an engine speed indicative signal;

sensing the rotational speed of a transmission output shaft;

determining a shift time which is defined between the point in time when the engine speed exhibits a predetermined rate of change, and a point in time when a predetermined relationship between the transmission output shaft rotational speed and the engine rotational speed occurs;

adjusting the line pressure level in a manner which brings the shift time to a target value for the instant shift;

monitoring the inputs of said engine speed sensor and said transmission output shaft rotational speed sensor; and inhibiting the line pressure adjustment in the event said monitoring indicates one of said engine speed sensor and said transmission output shaft rotational speed sensor is malfunctioning.

3. A transmission line pressure control arrangement for a transmission which is operatively connected with an engine, said control arrangement comprising:

an engine speed sensor, said engine speed sensor being arranged to produce an engine speed indicative signal, a transmission output shaft rotational speed sensor;

a transmission input shaft rotational speed sensor control means responsive to said transmission output shaft rotational speed sensor, said transmission input shaft rotational speed sensor and said engine speed sensor for:

determining a shift time which is defined between the point in time when the transmission output shaft rotational speed exhibits a first predetermined relationship with the rotational speed of the transmission input shaft and the time when the transmission output shaft rotational speed exhibits a second predetermined relationship with the rotational speed of the transmission input shaft;

adjusting the line pressure level in a manner which brings the shift time to a target value for the instant shift;

monitoring the inputs of said engine speed sensor, said transmission input shaft rotational speed sensor and said transmission output shaft rotational speed sensor; and inhibiting the line pressure adjustment in the event said monitoring indicates one of said engine speed sensor, said transmission input shaft rotational speed sensor and said transmission output shaft rotational speed sensor, is malfunctioning.

4. A method of controlling transmission line pressure in a transmission which is operatively connected with an engine, comprising the steps of:

sensing engine speed and producing an engine speed indicative signal;

sensing the rotational speed of a transmission input shaft;

sensing the rotational speed of a transmission output shaft;

determining a shift time which is defined between the point in time when: the transmission output shaft rotational speed exhibits a first predetermined relationship with the rotational speed of the transmission input shaft and the time when the transmission output shaft rotational speed exhibits a second predetermined relationship with the rotational speed of the transmission input shaft;

adjusting the line pressure level in a manner which brings the shift time to a target value for the instant shift;

monitoring the inputs of said engine speed sensor, said transmission input shaft rotational speed sensor and said transmission output shaft rotational speed sensor; and inhibiting the line pressure adjustment in the event said monitoring indicates one of said engine speed sensor, said transmission input shaft rotational speed sensor and said transmission output shaft rotational speed sensor, is malfunctioning.

5. A transmission line pressure control arrangement for a transmission which is operatively connected with an engine, said control arrangement comprising:

an engine speed sensor, said engine speed sensor being arranged to produce an engine speed indicative signal, a transmission output shaft rotational speed sensor;

control means responsive to said transmission output shaft rotational speed sensor and said engine speed sensor for:

determining a shift time which is defined between the point in time when the engine speed exhibits a predetermined rate of change, and a point in time when a predetermined relationship between the transmission output shaft rotational speed and the engine rotational speed occurs;

adjusting the line pressure level in a manner which brings the shift time to a target value for the instant shift;

monitoring said engine speed sensor input;

continuously updating a recorded value of the engine speed in accordance with the value indicated by said engine speed sensor input during non-shifting modes of transmission operation;

comparing the engine speed with the recorded value during upshifting modes of transmission operation;

determining the engine speed sensor to be malfunctioning in the event that the instant engine speed value and the recorded value exhibit a predetermined relationship during said comparison; and inhibiting the line pressure adjustment in the event said monitoring indicates said engine speed sensor is malfunctioning.

6. A method of controlling transmission line pressure in a transmission which is operatively connected with an engine, comprising the steps of:

sensing engine speed and producing an engine speed indicative signal, sensing the rotational speed of a transmission output shaft;

determining a shift time which is defined between the point in time when the engine speed exhibits a predetermined rate of change, and a point in time when a predetermined relationship between the transmission output shaft rotational speed and the engine rotational speed occurs;

adjusting the line pressure level in a manner which brings the shift time to a target value for the instant shift;

monitoring said engine speed sensor input;

continuously updating a recorded value of the engine speed in accordance with the value indicated by said engine speed sensor input during non-shifting modes of transmission operation;

comparing the engine speed with the recorded value during upshifting modes of transmission operation;

determining the engine speed sensor to be malfunctioning in the event that the instant engine speed value and the recorded value exhibit a predetermined relationship during said comparison; and inhibiting the line pressure adjustment in the event said monitoring indicates said engine speed sensor is malfunctioning.

* * * * *